United States Patent
Chang

(10) Patent No.: US 10,451,280 B2
(45) Date of Patent: Oct. 22, 2019

(54) COMBUSTOR PANEL HAVING MATERIAL TRANSITION REGION

(71) Applicant: United Technologies Corporation, Hartford, CT (US)

(72) Inventor: Hoyt Y. Chang, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 675 days.

(21) Appl. No.: 14/623,379

(22) Filed: Feb. 16, 2015

(65) Prior Publication Data

US 2016/0238251 A1 Aug. 18, 2016

(51) Int. Cl.
*F23R 3/00* (2006.01)
*F23R 3/60* (2006.01)
*B29C 64/00* (2017.01)
*B33Y 80/00* (2015.01)
*B33Y 10/00* (2015.01)
(Continued)

(52) U.S. Cl.
CPC .............. *F23R 3/007* (2013.01); *B29C 64/00* (2017.08); *F23R 3/002* (2013.01); *F23R 3/60* (2013.01); *B22F 2207/01* (2013.01); *B29L 2031/7504* (2013.01); *B33Y 10/00* (2014.12); *B33Y 50/00* (2014.12); *B33Y 80/00* (2014.12); *F23R 2900/00018* (2013.01)

(58) Field of Classification Search
CPC .. F23R 3/002; F23R 3/007; F23R 3/60; B29C 67/0051; B29C 64/00; B22F 2207/01; B33Y 10/00; B33Y 50/00; B33Y 80/00; B29L 2031/7504; F23M 2900/05003; F23M 2900/05004; F23M 2700/00; F23M 2700/0053; F23M 5/04
See application file for complete search history.

(56) References Cited

U.S. PATENT DOCUMENTS 5,174,368 A * 12/1992 Boury ..................... C04B 35/80
165/146
5,624,256 A * 4/1997 Pfeiffer .................... F23M 5/04
110/336
(Continued)

FOREIGN PATENT DOCUMENTS

EP 2789597 10/2014
WO 2013112217 8/2013

OTHER PUBLICATIONS

Extended European Search Report dated Jul. 14, 2016 in European Application No. 16155993.5.

*Primary Examiner* — Alain Chau
(74) *Attorney, Agent, or Firm* — Snell & Wilmer L.L.P.

(57) ABSTRACT

A combustor thermal shield is provided. The combustor thermal shield may have a combustor panel that may protect a surface of a combustor from heat and/or flame. The combustor thermal shield may be mounted to the combustor by an attachment stud formed as a unitary body with the combustor panel. The combustor panel and the attachment stud may be made of different materials. A transition region may be disposed between the attachment stud and the combustor thermal shield and formed as a unitary body with the combustor panel and the attachment stud. The transition region may be made of a mixture of the different materials. The mixture may vary according to a gradient as a function of proximity to the combustor panel and the attachment stud.

18 Claims, 6 Drawing Sheets

(51) Int. Cl.
*B33Y 50/00* (2015.01)
*B29L 31/00* (2006.01)

(56) References Cited

U.S. PATENT DOCUMENTS

| | | | | |
|---|---|---|---|---|
| 6,223,538 | B1* | 5/2001 | Benz | F23M 5/02 |
| | | | | 60/753 |
| 6,455,122 | B1* | 9/2002 | Igashira | C03C 14/002 |
| | | | | 264/272.13 |
| 7,540,155 | B2* | 6/2009 | Taut | F23M 5/00 |
| | | | | 110/336 |
| 8,137,826 | B2* | 3/2012 | Louchet-Pouillerie | |
| | | | | C04B 41/009 |
| | | | | 427/255.394 |
| 9,683,743 | B2* | 6/2017 | Clemen | F23R 3/00 |
| 2007/0289307 | A1* | 12/2007 | Grote | B28B 1/16 |
| | | | | 60/753 |
| 2010/0003504 | A1* | 1/2010 | Louchet-Pouillerie | |
| | | | | C04B 41/009 |
| | | | | 428/334 |
| 2010/0011775 | A1* | 1/2010 | Garry | C23C 4/02 |
| | | | | 60/752 |
| 2012/0240584 | A1* | 9/2012 | Berdou | F23R 3/002 |
| | | | | 60/722 |
| 2014/0130501 | A1* | 5/2014 | Clemen | F23R 3/00 |
| | | | | 60/722 |
| 2014/0216042 | A1* | 8/2014 | Hanson | F23R 3/06 |
| | | | | 60/754 |
| 2014/0250894 | A1 | 9/2014 | Petty, Sr. et al. | |
| 2015/0013340 | A1* | 1/2015 | Pinnick | F23R 3/002 |
| | | | | 60/754 |
| 2015/0128602 | A1* | 5/2015 | Clemen | F23R 3/002 |
| | | | | 60/754 |
| 2015/0239046 | A1* | 8/2015 | McMahan | B33Y 10/00 |
| | | | | 428/548 |

* cited by examiner

COMBUSTOR PANEL HAVING MATERIAL TRANSITION REGION

FIELD

The present disclosure relates generally to a gas turbine engine, and more specifically, to combustor panels for gas turbine engines.

BACKGROUND

A gas turbine engine includes combustors that introduce and/or ignite fuel within the gas turbine engine. In a gas turbine engine, the burning fuel contributes to a high temperature gas flow to create mechanical power. In a gas turbine engine, turbine rotor blades are driven at least in part by the high temperature gas flow and drive a compressor and, optionally, an electric generator to generate mechanical and/or electrical power.

The temperature within a combustor is often very high. Combustors are often internally lined with panels to protect the combustor from these high temperatures. However, such panels are typically made of metal and often crack due to thermal mechanical fatigue. While metal provides for strong fasteners to retain the combustor panel in place, such metal is often subject to cracking due to thermal mechanical fatigue, permitting portions of the panel to be liberated and to collide downstream with other turbine engine structures such as with turbine blades or with stator vanes.

SUMMARY

The forgoing features and elements may be combined in various combinations without exclusivity, unless expressly indicated herein otherwise. These features and elements as well as the operation of the disclosed embodiments will become more apparent in light of the following description and accompanying drawings.

A combustor thermal shield is disclosed. The combustor thermal shield may include a combustor panel having a first material composition, a transition region having a third material composition disposed radially outward of the combustor panel and forming a unitary body with the combustor panel, and an attachment stud including a cylindrical boss extending radially outward of the transition region and having a second material composition.

The combustor thermal shield may include various additional features. For example, the combustor thermal shield may include a standoff pin oriented parallel to the attachment stud and extending radially outward of the transition region. The standoff pin may be configured to mechanically contact an inner face of a combustor shell whereby a first shield spacing distance is achieved. Moreover, the transition region may extend radially outward of the combustor panel whereby the transition region contributes to the first shield spacing distance. In various embodiments, the transition region is embedded in the combustor panel, whereby the transition region is co-planar with the combustor panel. Moreover, the standoff pin may have the second material composition.

The first material composition may include a ceramic. The second material composition may include a metal. The third material composition may include a gradient from the first material composition to the second material composition. The combustor thermal shield may include the first material composition including a ceramic, the second material composition including a metal, and the third material composition including a gradient from the first material composition to the second material composition. The gradient may include a linear gradient. The gradient may include a logarithmic gradient.

The combustor thermal shield may also have a backing panel disposed radially outward of the transition region and radially inward of the attachment stud. The backing panel may include the second material composition.

A method of forming a combustor thermal shield by an additive material deposition process is disclosed. The method may include forming, by the additive material deposition process, a combustor panel including a first material composition, forming, by the additive material deposition process, a transition region having a third material composition including a gradient from the first material composition to a second material composition, forming, by the additive material deposition process, an attachment stud including the second material composition, and forming, by the additive material deposition process, a standoff pin. The standoff pin may include the second material composition. The first material composition may include a ceramic. The second material composition may include a metal. The gradient may include a linear gradient. Moreover, the gradient may include a logarithmic gradient.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
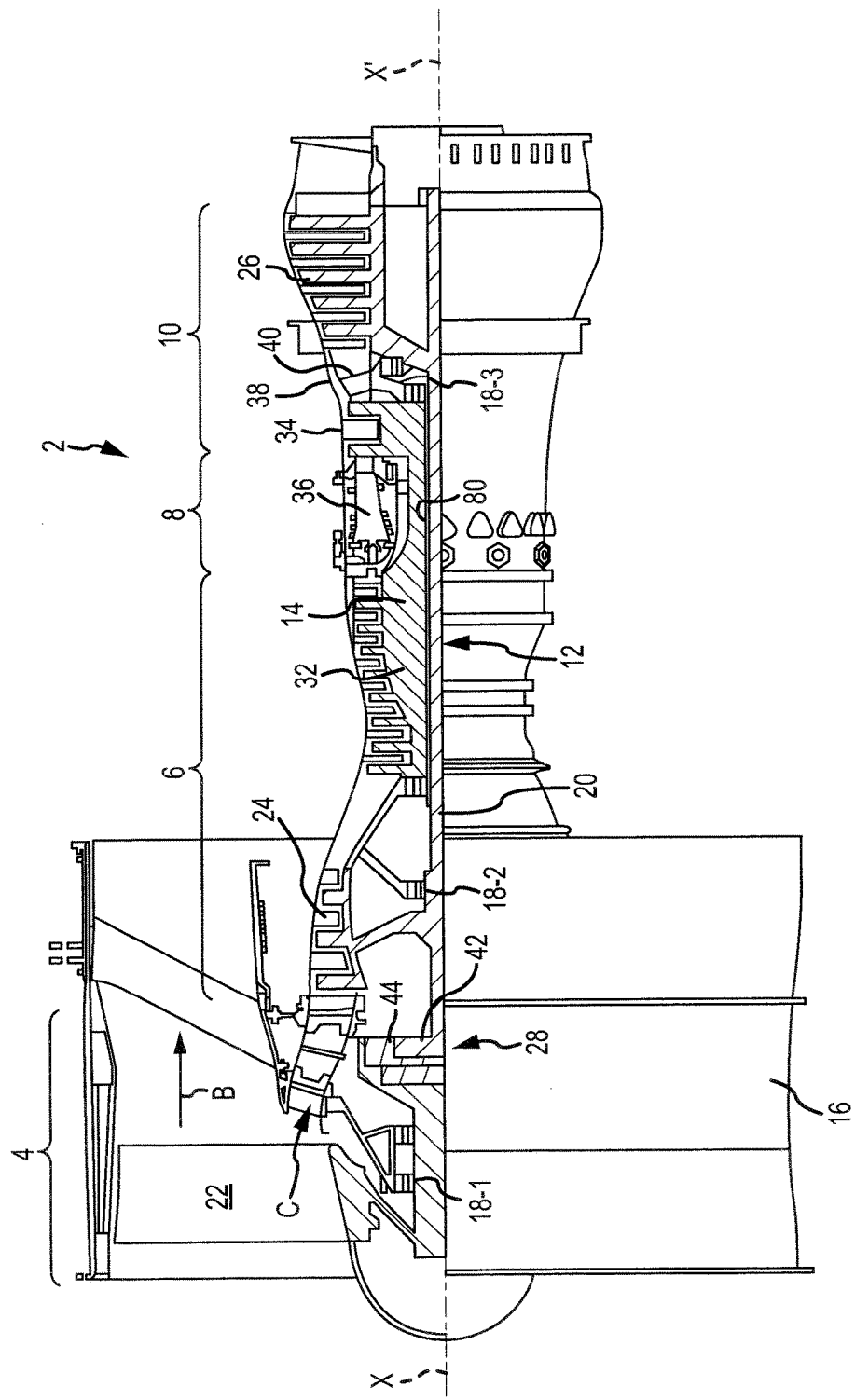
FIG. 1 illustrates cross-sectional view of an exemplary gas turbine engine, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this invention and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that a first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that a first component is positioned at a greater distance away from the engine central longitudinal axis, than the second component. A first component that is "radially inward" of a second component means that the first component is positioned closer to the engine central longitudinal axis, than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor.

In various embodiments and with reference to FIG. 1, an exemplary gas turbine engine 2 is provided. Gas turbine engine 2 may be a two-spool turbofan that generally incorporates a fan section 4, a compressor section 6, a combustor section 8 and a turbine section 10. Alternative engines may include, for example, an augmentor section among other systems or features. In operation, fan section 4 can drive air along a bypass flow-path B while compressor section 6 can drive air along a core flow-path C for compression and communication into combustor section 8 then expansion through turbine section 10. Although depicted as a turbofan gas turbine engine 2 herein, it should be understood that the concepts described herein are not limited to use with turbofans as the teachings may be applied to other types of turbine engines including three-spool architectures.

Gas turbine engine 2 may generally comprise a low speed spool 12 and a high speed spool 14 mounted for rotation about an engine central longitudinal axis X-X' relative to an engine static structure 16 via several bearing systems 18-1, 18-2, and 18-3. It should be understood that various bearing systems at various locations may alternatively or additionally be provided, including for example, bearing system 18-1, bearing system 18-2, and bearing system 18-3.

Low speed spool 12 may generally comprise an inner shaft 20 that interconnects a fan 22, a low pressure compressor section 24 (e.g., a first compressor section) and a low pressure turbine section 26 (e.g., a first turbine section). Inner shaft 20 may be connected to fan 22 through a geared architecture 28 that can drive the fan 22 at a lower speed than low speed spool 12. Geared architecture 28 may comprise a gear assembly 42 enclosed within a gear housing 44. Gear assembly 42 couples the inner shaft 20 to a rotating fan structure. High speed spool 14 may comprise an outer shaft 30 that interconnects a high pressure compressor section 32 (e.g., second compressor section) and high pressure turbine section 34 (e.g., second turbine section). A combustor 36 may be located between high pressure compressor section 32 and high pressure turbine section 34. A mid-turbine frame 38 of engine static structure 16 may be located generally between high pressure turbine section 34 and low pressure turbine section 26. Mid-turbine frame 38 may support one or more bearing systems 18 (such as 18-3) in turbine section 10. Inner shaft 20 and outer shaft 30 may be concentric and rotate via bearing systems 18 about the engine central longitudinal axis X-X', which is collinear with their longitudinal axes. As used herein, a "high pressure" compressor or turbine experiences a higher pressure than a corresponding "low pressure" compressor or turbine.

The core airflow C may be compressed by low pressure compressor section 24 then high pressure compressor section 32, mixed and burned with fuel in combustor 36, then expanded over high pressure turbine section 34 and low pressure turbine section 26. Mid-turbine frame 38 includes airfoils 40, which are in the core airflow path. Turbines 26, 34 rotationally drive the respective low speed spool 12 and high speed spool 14 in response to the expansion.

Gas turbine engine 2 may be, for example, a high-bypass geared aircraft engine. In various embodiments, the bypass ratio of gas turbine engine 2 may be greater than about six (6). In various embodiments, the bypass ratio of gas turbine engine 2 may be greater than ten (10). In various embodiments, geared architecture 28 may be an epicyclic gear train, such as a star gear system (sun gear in meshing engagement with a plurality of star gears supported by a carrier and in meshing engagement with a ring gear) or other gear system. Geared architecture 28 may have a gear reduction ratio of greater than about 2.3 and low pressure turbine section 26 may have a pressure ratio that is greater than about 5. In various embodiments, the bypass ratio of gas turbine engine 2 is greater than about ten (10:1). In various embodiments, the diameter of fan 22 may be significantly larger than that of the low pressure compressor section 24, and the low pressure turbine section 26 may have a pressure ratio that is greater than about 5:1. Low pressure turbine section 26 pressure ratio may be measured prior to inlet of low pressure turbine section 26 as related to the pressure at the outlet of low pressure turbine section 26 prior to an exhaust nozzle. It should be understood, however, that the above parameters are exemplary of various embodiments of a suitable geared architecture engine and that the present disclosure contemplates other turbine engines including direct drive turbofans.

In various embodiments, the next generation of turbofan engines may be designed for higher efficiency, which may be associated with higher pressure ratios and higher temperatures in the high speed spool 14. These higher operating temperatures and pressure ratios may create operating environments that may cause thermal loads that are higher than thermal loads conventionally encountered, which may shorten the operational life of current components. In various embodiments, operating conditions in high pressure compressor section 32 may be approximately 1400° F. (approximately 760° C.) or more, and operating conditions in combustor 36 may be higher.

In various embodiments, combustor section 8 may comprise one or more combustor 36. As mentioned, the core airflow C may be compressed, then mixed with fuel and ignited in the combustor 36 to produce high speed exhaust gases.

Figure 2:
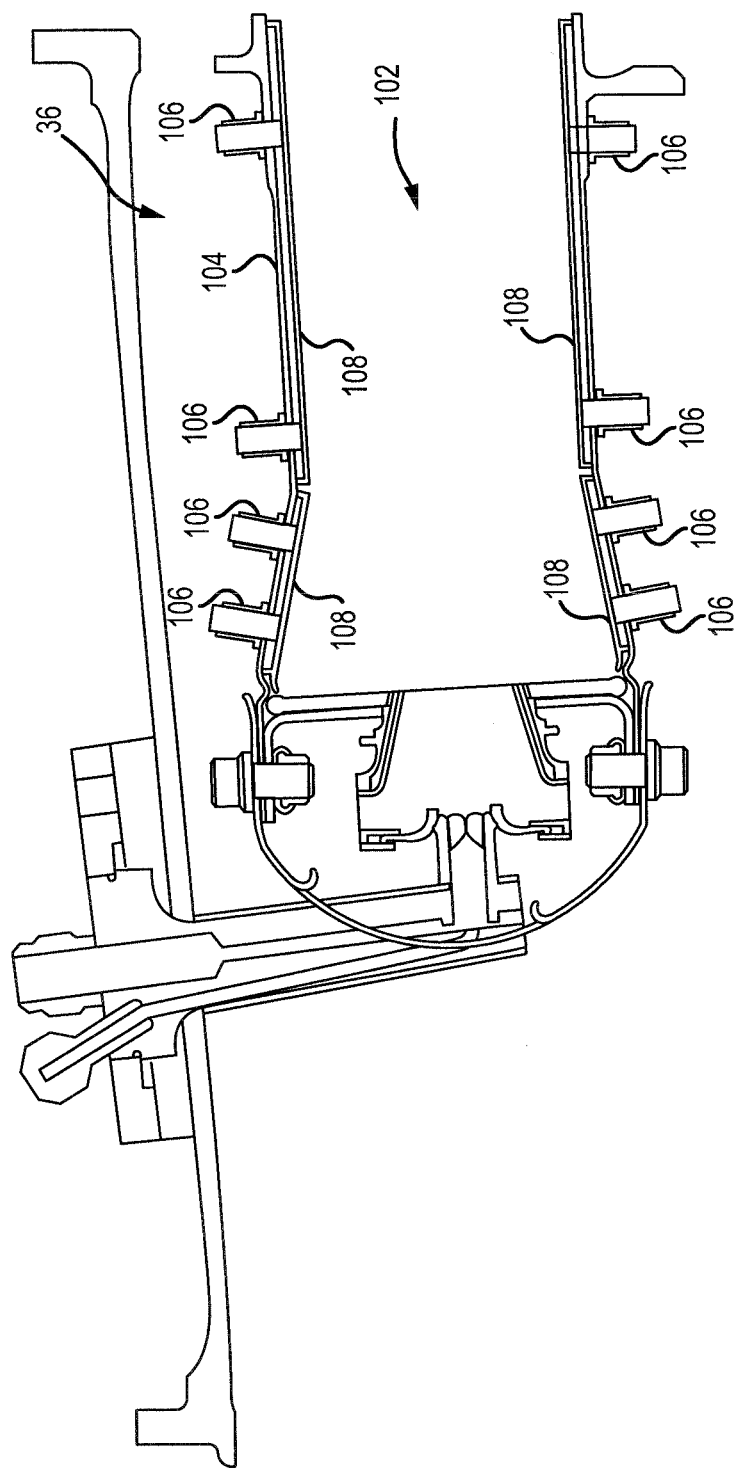
FIG. 2 illustrates a combustor, in accordance with various embodiments.

Combustor 36 is thus exposed to high temperature flame and/or gases during the operation of the gas turbine engine 2. As such, and with reference to FIGS. 1 and 2, one or more combustor thermal shields 108 may be positioned in combustor 36 to protect various features of the combustor 36 from the high temperature flame and/or gases. A combustor 36 may comprise a combustor chamber 102 defined by a combustor shell 104. The combustor chamber 102 may form a region of mixing of core airflow C and fuel, and may direct the high-speed exhaust gases produced by the ignition of this mixture inside the combustor 36. The combustor chamber 102 may be defined by a surrounding combustor shell 104. The combustor shell 104 may provide structural support to the combustor 36 and its components. For example, a combustor shell 104 may comprise a substantially cylindrical canister portion defining an inner area comprising the combustor chamber 102.

It may be desirable to protect the combustor shell 104 from the deleterious effects of high temperatures. One or more combustor thermal shields 108 may be disposed inside the combustor chamber 102 and may provide such protection.

With reference to FIGS. 2 and 3-5, a combustor thermal shield 108 may comprise a partial cylindrical surface section, e.g., may have a cross-section comprising an arc length. One or more combustor thermal shields 108 may be arranged radially inward of the combustor shell 104, for example, circumferentially about the inner surface of the combustor shell 104. The combustor thermal shields 108 may comprise variety of materials.

As used herein, "a material deposition process" or an "additive material deposition process" may include at least one of 3D printing, lithography such as stereolithography ("SLA"), various laser sintering processes, or any other appropriate technique or combination of techniques. For example, a combustor thermal shield 108 may be formed by an additive material deposition process wherein materials, including dissimilar materials, such as metal and ceramic, may be mixed according to various ratios and formed into various aspects of a combustor thermal shield 108. Thus, while a combustor thermal shield 108 may comprise a unitary body, various elements of the combustor thermal shield 108 may have various different material compositions.

The combustor thermal shields 108 may comprise a combustor panel 110. A combustor panel 110 may comprise an insulative material. The combustor panel 110 may comprise a partial cylindrical surface section (e.g., may have a cross-section comprising an arc length). The combustor panel 110 may be directly exposed to the heat and/or flame in the combustor chamber 102. Thus, the combustor panel 110 may comprise any suitable heat tolerant material. In this manner, the combustor panel 110 may be resistant to thermal mechanical fatigue, such that cracking and liberation of portions of the combustor panel 110 into the core airflow C may be ameliorated.

The combustor thermal shield 108 may comprise a first material composition. In various embodiments, the first material composition comprises a ceramic material. For example, the first material composition may comprise silicone oxide, or may comprise silicon carbide, or may comprise any suitable heat tolerant material.

The combustor thermal shield 108 may comprise an attachment stud 114. An attachment stud 114 may comprise a boss extending radially outward relative to the combustor panel 110. The attachment stud 114 may comprise a cylindrical boss, such as a threaded pin, or may comprise a rectangular boss, such as for receiving a clip, or may comprise any other apparatus whereby the combustor thermal shield 108 may be mounted to the combustor shell 104. In various embodiments, the attachment stud 114 comprises a threaded stud that extends through a corresponding aperture in the combustor shell 104, and is retained in position by an attachment nut 106 disposed outward of the combustor shell 104 and torqued so that the attachment stud 114 is preloaded with a retaining force and securely affixes the combustor thermal shield 108 in substantially fixed position relative to the combustor shell 104.

The attachment stud 114 may comprise a second material composition. In various embodiments, the second material composition comprises a metal material. For example, the second material composition may austenitic nickel-chromium-based alloy or may comprise an alloy of titanium, for example titanium-zirconium-molybdenum, or may comprise any ductile material sufficiently ductile to withstand the pre-loading exerted by the attachment nut 106.

Thus, the combustor panel 110 may comprise a first material composition selected for heat tolerance properties and the attachment stud 114 may comprise a second material composition selected for ductility and resilience under the pre-loading exerted by the attachment nut 106. In general, the first material composition is selected to be less prone to thermal mechanical fatigue, but may be brittle, while the second material composition is selected to be ductile and resilient under the pre-loading exerted by the attachment nut 106, but may be more prone to thermal mechanical fatigue. As such, while the first material composition may have properties desirable for its location and purpose, and while the second material composition may have properties desirable for its location and purpose, the combustor panel 110 and the attachment stud 114 are joined in substantially fixed mechanical communication as a contiguous solid body.

In various embodiments, this joining is accomplished by a transition region 112. A combustor thermal shield 108 may comprise a transition region 112 disposed between the combustor panel 110 comprising a first material composition and the attachment stud 114 comprising a second material composition and may be integrally formed with both as a contiguous solid body. The transition region 112 may comprise a material gradient wherein the first material composition and the second material composition are mixed. For example, across-section of the transition region 112 proximate to the attachment stud 114, may comprise the second material composition, whereas cross-sections of the transition region 112 increasingly proximate to the combustor panel 110 may increasingly comprise the first material composition. In other words, the transition region 112 may comprise a third material composition, the third material composition comprising a combination of the first material composition and the second material composition. This ratio may be a non-constant function of position. For example, different cross sectional planes of the transition region 112 may have different ratios of first material composition and second material composition. Accordingly, the third material composition may comprise a gradient. The gradient may vary from predominantly the first material composition to predominantly the second material composition along a path extending through the transition region 112 radially outward from the combustor panel 110 to the attachment stud 114. While the attachment stud 114 comprises a second material composition and the combustor panel 110 comprises a first material composition, the transition region 112 comprises a third material composition comprising a gradient between the two, although the entire body may be integrally formed as a unitary solid.

In various embodiments, the third material composition may comprise a linear gradient. In further embodiments, the third material composition may comprise a logarithmic gradient, or may comprise a discontinuous gradient, or may comprise a gradient with various points of inflection, or may comprise any gradient as desired.

The combustor thermal shield 108 may further comprise a standoff pin 116. A standoff pin 116 may comprise a boss extending radially outward relative to the combustor panel 110. The standoff pin 116 may mechanically contact the inner face of the combustor shell 104 so that in response to the attachment nut 106 tightening, a first shield spacing distance 120 is maintained between the combustor thermal shield 108 and the combustor shell 104. In various embodiments, the standoff pin 116 comprises the second material composition and provides a reaction force against the preloading exerted by the attachment nut 106 on the attachment stud 114.

Figure 3:
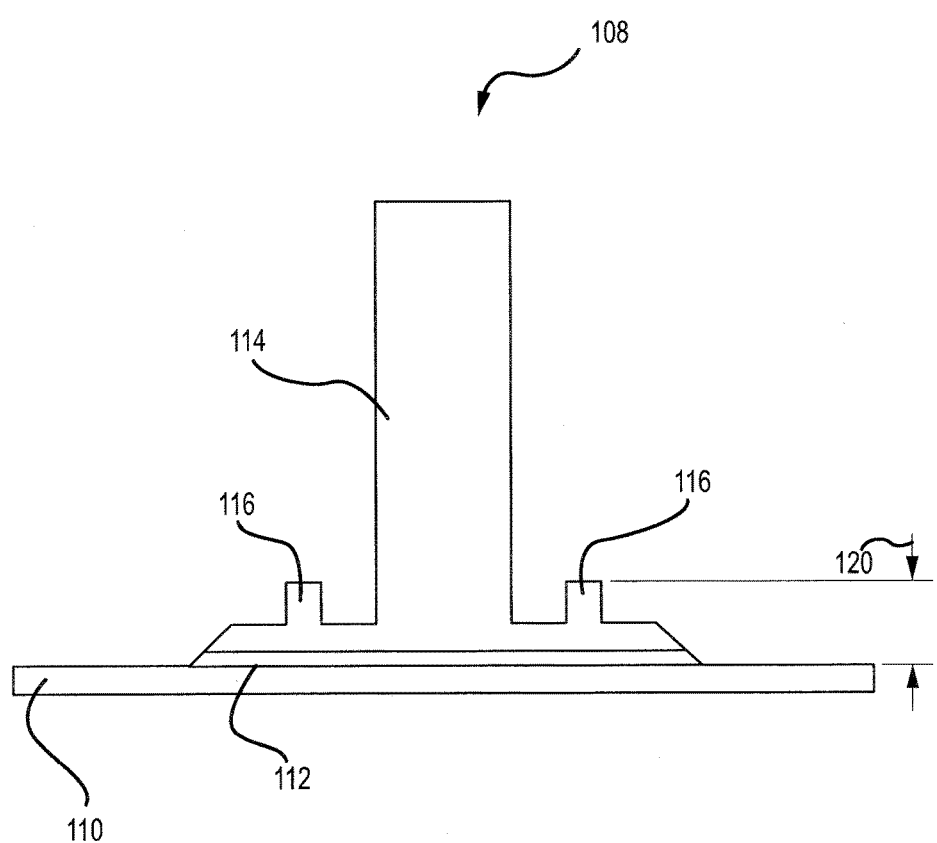
FIG. 3 illustrates a detailed view of a combustor thermal shield having a set-off transition region, in accordance with various embodiments.
Figure 4:
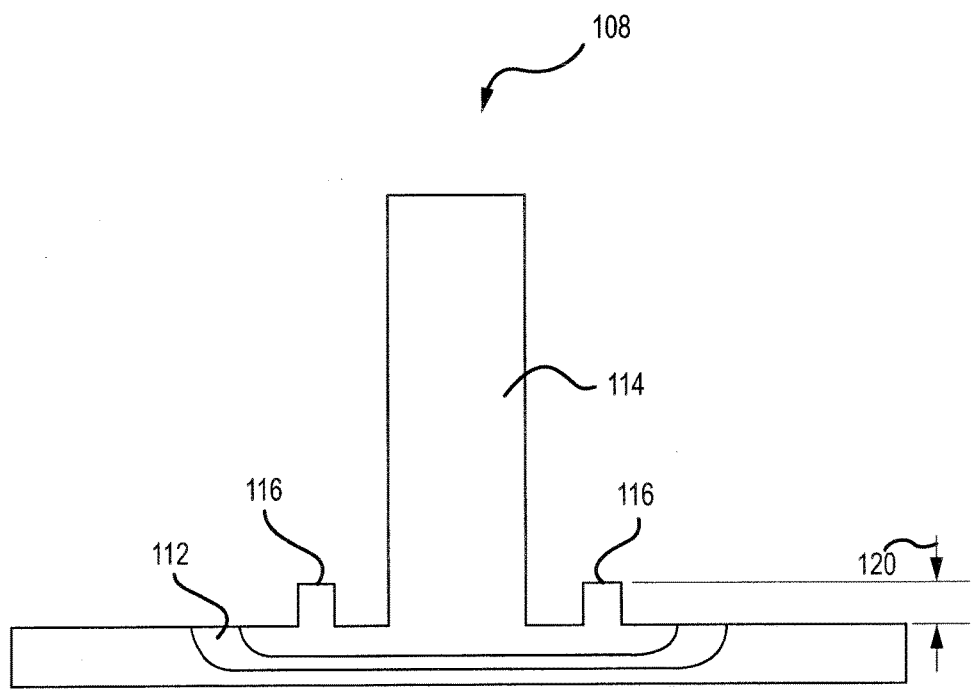
FIG. 4 illustrates a detailed view of a combustor thermal shield having an embedded transition region, in accordance with various embodiments.

The transition region 112 may be disposed in various different orientations relative to the combustor panel 110 and the attachment stud 114. With reference to FIG. 3, a transition region 112 may be layered between the combustor panel 110 and the attachment stud 114 (e.g., a set-off transition region). The transition region 112 may be stacked outward of the combustor panel 110 and the attachment stud 114 may be stacked out ward of the transition region 112. As such, the transition region 112 may contribute to the depth of the first shield spacing distance 120, in addition to the contribution made by the standoff pin 116. With reference to FIG. 4, a transition region 112 may be embedded in the combustor panel 110 (e.g., an embedded transition region). The attachment stud 114 may be stacked outward of the combustor panel 110, the combustor panel 110 having the transition region 112 embedded integrally within the plane of the combustor panel 110. As such, rather than contributing to the depth of the first shield spacing distance 120, the transition region 112 may contribute to a localized thinning of the combustor panel 110.

A transition region 112 comprising a set-off transition region thus may provide for uniform thickness of the combustor panel 110, and may provide for an increased first shield spacing distance 120 versus a transition region 112 comprising an embedded transition region. Correspondingly, a transition region 112 comprising an embedded transition region may provide for a more compact design, and may contribute to a localized thinning of the combustor panel 110. In further embodiments, aspects of both the set-off transition region and the embedded transition region may be combined, for example, localized thinning of the combustor panel 110, contribution to the first shield spacing distance 120, and the like.

Figure 5:
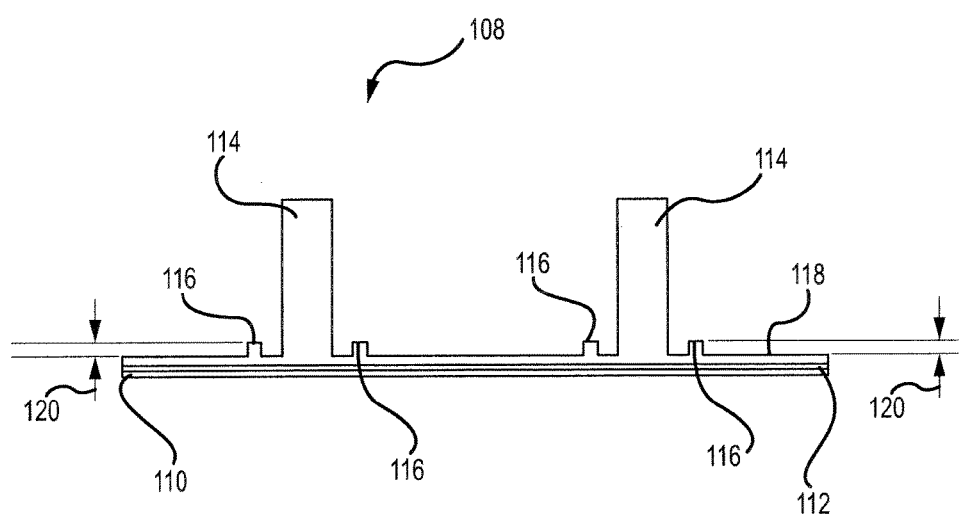
FIG. 5 depicts a detailed view of a combustor thermal shield having a backing panel, in accordance with various embodiments.

With reference to FIG. 5, a combustor thermal shield 108 may comprise a set-off transition region; however, the attachment stud 114 may be widened at the interface with the transition region 112 such as to widen to be a backing panel 118. A backing panel 118 comprises a panel of material contiguous with the boundaries of the combustor panel 110 and comprising the second material composition. In this manner, the combustor panel 110 of the combustor thermal shield 108 may be provided with enhanced structural support. In various embodiments, the first material composition and the second material composition are selected with regard to a ratio of coefficients of thermal expansion of the first material composition and the second material composition, such as to ameliorate localized dislocation and/or cracking such as in embodiments wherein the combustor thermal shield 108 comprises a backing panel 118.

Figure 6:
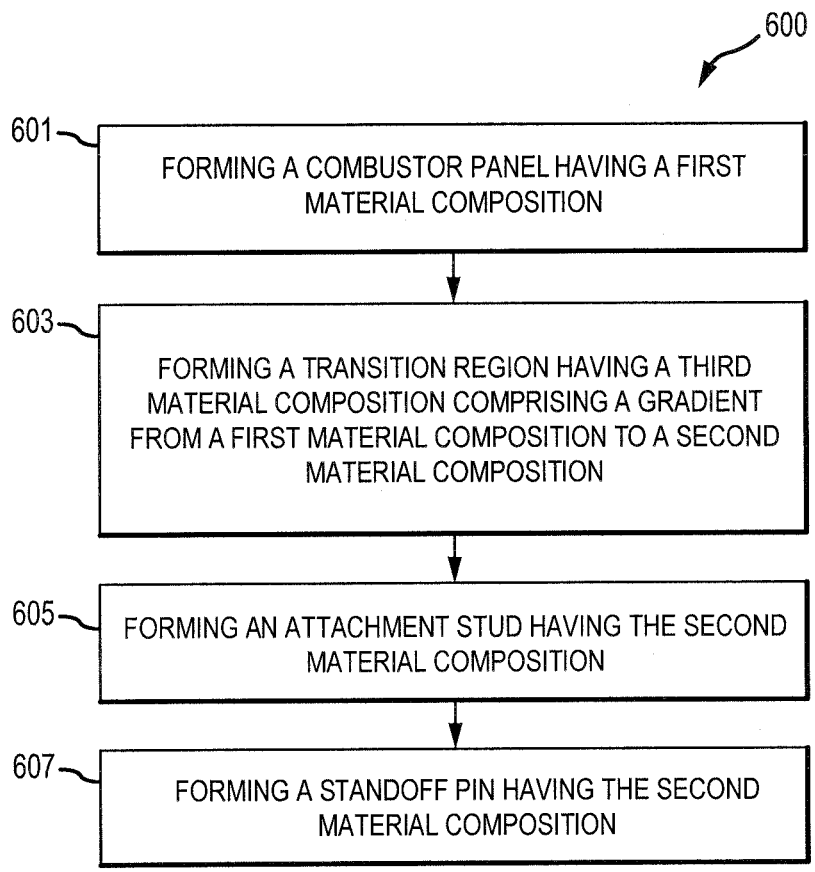
FIG. 6 depicts a method of forming a combustor thermal shield, in accordance with various embodiments.

Methods of forming a combustor thermal shield 108 are also presented. For instance, with reference to FIG. 6, a method 600 may include forming, by a material deposition process, a combustor panel 110 having a first material composition (Step 601); forming, by a material deposition process, a transition region 112, wherein the material composition of the transition region 112 comprises a third material composition comprising a gradient from a first material composition to a second material composition (Step 603); and forming, by a material deposition process, an attachment stud 114 having the second material composition (Step 605). The method 600 may further include forming, by a material deposition process, a standoff pin 116 having the second material composition (Step 607). The various steps may be carried out in parallel, or in various sequences as desired.

Having discussed various aspects of a combustor thermal shield 108, a combustor thermal shield 108 may be made of many different materials or combinations of materials. For example, various components of the system may be made from metal. For example, various aspects of a combustor thermal shield 108 may comprise metal, such as titanium, aluminum, steel, or stainless steel, though it may alternatively comprise numerous other materials configured to provide support. Various components of the system may be made from other materials such as for example, composite, ceramic, plastics, polymers, alloys, glass, binder, epoxy, polyester, acrylic, or any material or combination of materials having desired material properties, such as heat tolerance, strength, stiffness, or weight. In various embodiments, various portions of a combustor thermal shield 108 as disclosed herein are made of different materials or combinations of materials, and/or may comprise coatings. Moreover, as disclosed various components of the combustor thermal shield 108 may comprise mixtures of different materials according to different ratios, gradients, and the like.

In various embodiments, a combustor thermal shield 108 may comprise multiple materials, or any material configuration suitable to enhance or reinforce the resiliency and/or support of the system when subjected to wear in an aircraft operating environment or to satisfy other desired electromagnetic, chemical, physical, or material properties, for example coefficient of thermal expansion, ductility, weight, flexibility, strength, or heat tolerance.

In various embodiments, various components may comprise an austenitic nickel-chromium-based alloy such as Inconel®, which is available from Special Metals Corporation of New Hartford, N.Y., USA. In various embodiments, various components may comprise ceramic matrix composite (CMC). Moreover, various aspects may comprise refractory metal, for example, an alloy of titanium, for example titanium-zirconium-molybdenum (TZM).

Various benefits and advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting. For example, while the discussion herein has been focused on airfoils comprising stator vanes, as also mentioned, the various features and elements may be implemented in airfoils comprising rotor vanes, or any desired airfoil.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A combustor thermal shield of a combustor of a gas turbine engine comprising:

a combustor panel comprising a first material composition;

a transition region comprising a third material composition disposed outward, relative to the combustor, of the combustor panel and forming a unitary body with the combustor panel; and an attachment stud comprising a cylindrical boss extending outward, relative to the combustor, of the transition region and comprising a second material composition, wherein:

the first material composition is different than the second material composition;

the third material composition comprises a gradient from the first material composition to the second material composition;

the first material composition of the combustor panel comprises a first region of localized thinning, as measured across the combustor panel in a direction perpendicular to the combustor panel;

the first region of localized thinning is an outwardly facing recess defined in the first material composition;

a perimeter of the outwardly facing recess surrounds the attachment stud;

a first thickness of the first material composition of the combustor panel within the first region of localized thinning is less than a second thickness of the first material composition of the combustor panel outside the first region of localized thinning; and the transition region occupies at least a portion of the outwardly facing recess such that the transition region is embedded inward of a plane defined by an outwardly facing surface of the combustor panel and is disposed between the first region of localized thinning of the first material composition of the combustor panel and the attachment stud.

2. The combustor thermal shield of claim 1, further comprising a standoff pin comprising the second material composition, oriented parallel to the attachment stud, and extending outward of the transition region.

3. The combustor thermal shield of claim 2, wherein the standoff pin is configured to mechanically contact an inner face of a combustor shell whereby a first shield spacing distance is achieved.

4. The combustor thermal shield of claim 3, wherein a second surface of the second material composition from which the standoff pin extends is co-planar with both a peripheral surface of the transition region and a first surface of the first material composition of the combustor panel.

5. The combustor thermal shield of claim 1, wherein the first material composition comprises a ceramic.

6. The combustor thermal shield of claim 1, wherein the second material composition comprises a metal.

7. The combustor thermal shield of claim 1, wherein the first material composition comprises a ceramic, wherein the second material composition comprises a metal, and wherein the third material composition comprises a gradient from the first material composition to the second material composition.

8. The combustor thermal shield of claim 7, wherein the gradient comprises a linear gradient.

9. The combustor thermal shield of claim 7, wherein the gradient comprises a logarithmic gradient.

10. The combustor thermal shield of claim 1, further comprising a backing panel disposed outward of the transition region and inward of the attachment stud.

11. The combustor thermal shield of claim 10, wherein the backing panel comprises the second material composition.

12. A method of forming a combustor thermal shield of a combustor of a gas turbine engine by an additive material deposition process comprising: forming, by the additive material deposition process, a combustor panel comprising a first material composition; forming, by the additive material deposition process, a transition region comprising a third material composition comprising a gradient from the first material composition to a second material composition; forming, by the additive material deposition process, an attachment stud comprising the second material composition; and forming, by the additive material deposition process, a standoff pin, wherein:

the first material composition is different than the second material composition;

forming the combustor thermal shield comprises forming a first region of localized thinning of the combustor panel;

the first region of localized thinning, as measured across the combustor panel in a direction perpendicular to the combustor panel, is an outwardly facing recess defined in the first material composition;

a perimeter of the outwardly facing recess surrounds the attachment stud;

a first thickness of the first material composition of the combustor panel within the first region of localized thinning is less than a second thickness of the first material composition of the combustor panel outside the first region of localized thinning; and forming the transition region comprises occupying at least a portion of the outwardly facing recess with the transition region such that the transition region is embedded inward of a plane defined by an outwardly facing surface of the combustor panel and is disposed between the first region of localized thinning of the first material composition of the combustor panel and the attachment stud.

13. The method according to claim 12, wherein the standoff pin comprises the second material composition.

14. The method according to claim 13, wherein the first material composition comprises a ceramic.

15. The method according to claim 14, wherein the second material composition comprises a metal.

16. The method according to claim 15, wherein the gradient comprises a linear gradient.

17. The method according to claim 15, wherein the gradient comprises a logarithmic gradient.

18. A combustor thermal shield of a combustor of a gas turbine engine comprising:

a combustor panel comprising a first material composition;

a transition region comprising a third material composition disposed outward, relative to the combustor, of the combustor panel; and an attachment stud comprising a cylindrical boss extending outward, relative to the combustor, of the transition region and comprising a second material composition, the transition region and the attachment stud forming a unitary body with the combustor panel, wherein:

a first shield spacing is defined between an outward facing surface of the combustor panel and an inward facing surface of a combustor shell;

the first material composition is different than the second material composition;

the third material composition comprises a gradient from the first material composition to the second material composition;

the transition region extends outward from the outward facing surface of the combustor panel such that the transition region occupies at least a portion of the first shield spacing.

* * * * *